(12) United States Patent
Sasaki et al.

(10) Patent No.: US 6,429,544 B1
(45) Date of Patent: Aug. 6, 2002

(54) ELECTRICAL EQUIPMENT MODULE

(75) Inventors: Atsushi Sasaki; Satoshi Kawai, both of Hikone; Eiji Ichii, Hiratsuka; Akihito Yahara, Hikone, all of (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 09/662,480

(22) Filed: Sep. 15, 2000

Related U.S. Application Data

(63) Continuation of application No. PCT/JP00/00171, filed on Jan. 17, 2000.

(30) Foreign Application Priority Data

Jan. 18, 1999 (JP) .............................................. 11-009296
Jan. 25, 1999 (JP) .............................................. 11-015658

(51) Int. Cl.$^7$ ................................................. H02J 1/00
(52) U.S. Cl. ....................................... 307/10.1; 439/623
(58) Field of Search ................................. 307/9.1, 10.1; 361/825, 826, 827, 828, 833, 835, 837, 622, 728; 439/34, 76.2, 76.1, 45, 404, 67, 502, 623

(56) References Cited

U.S. PATENT DOCUMENTS

| | | | |
|---|---|---|---|
| 4,122,357 A | * 10/1978 | Sumida | 307/10.1 |
| 4,470,632 A |   9/1984 | Babbs | |
| 4,845,708 A | *  7/1989 | Herrmann, Jr. et al. | 307/10.1 |
| 4,950,168 A | *  8/1990 | Watanabe et al. | 439/34 |
| 5,040,168 A | *  8/1991 | Maue et al. | 359/115 |
| 5,424,586 A | *  6/1995 | Hattori et al. | 307/10.1 |
| 5,428,535 A | *  6/1995 | Katsumata et al. | 361/785 |
| 5,483,853 A |   1/1996 | Moradell et al. | |
| 5,501,605 A | *  3/1996 | Ozaki et al. | 439/34 |
| 5,581,130 A | * 12/1996 | Boucheron | 307/10.1 |
| 5,598,627 A | *  2/1997 | Saka et al. | 439/67 |
| 5,760,490 A | *  6/1998 | Yanase | 307/10.1 |
| 5,771,850 A | *  6/1998 | Okada | 123/143 C |
| 5,869,907 A | *  2/1999 | Marler | 307/10.1 |
| 5,877,944 A | *  3/1999 | Onizuka | 361/826 |
| 6,011,319 A | *  1/2000 | Kelly et al. | 307/40.1 |
| 6,068,491 A | *  5/2000 | Hofmeister et al. | 439/34 |
| 6,116,916 A | *  9/2000 | Kasai | 361/826 |
| 6,186,106 B1 | *  2/2001 | Glovatsky et al. | 123/143 C |

FOREIGN PATENT DOCUMENTS

| | | |
|---|---|---|
| JP | 61-165835 | 10/1986 |
| JP | 5-058230 | 3/1993 |
| JP | 9-245550 | 9/1997 |
| JP | 10-292433 | 11/1998 |
| JP | 10-310002 | 11/1998 |

* cited by examiner

*Primary Examiner*—Ronald W. Leja
*Assistant Examiner*—Roberto Rios
(74) *Attorney, Agent, or Firm*—Knobbe, Martens, Olson & Bear, LLP

(57) ABSTRACT

An electrical equipment module is mounted in, for example, an electrically-powered seat unit for a vehicle. Multiple wire groups (52–56) comprised of wire harnesses or flat cables are led out of a module body (51) of the electrical equipment module (50) from different sides of the module body, thus reducing the outside diameter and thickness of each wire group so that the module body is thin and suited to be mounted in narrow layout space under a seat. By mounting, to the module body, a connector for connecting a printed circuit board (51*m*) in the module body to an external power supply or an external sensor and by making complicated wiring between the connector and the printed circuit board (51*m*) in advance in the module body, an assembling (wiring) work at the time of manufacturing the electrical equipment module is simplified.

15 Claims, 13 Drawing Sheets

ELECTRICAL EQUIPMENT MODULE

This application claims priority under 35 U.S.C. Section 120 as a continuation to International Application No. PCT/JP00/00171, filed on Jan. 17, 2000. The disclosure of this application is hereby incorporated by reference in its entirety.

TECHNICAL FIELD

The present invention relates to an electrical equipment module for controlling the power supply to and the operation of electrical equipment.

BACKGROUND ART

In various electric devices, an electrical equipment module is used, which incorporates a power distribution section for distributing electric power supplied from an external power source to electrical equipment such as a motor or which incorporates a control section for controlling the drive of electrical equipment. An electrically-powered seat unit for a vehicle, serving as this type of electric device, typically includes a seat adjuster adapted to be fixed to the floor panel of the vehicle, a seat cushion attached to an upper movable section of the seat adjuster for back-and-forth motion and up-and-down motion, a seat back attached to a rear-end side movable section of the adjuster for tilting motion, and motors drivingly coupled to the movable sections of the seat adjuster. The seat unit is designed to move the seat cushion backward, forward, upward and downward with respect to the floor panel and to cause the seat back to recline.

An electrically-powered seat unit 1 exemplarily shown in FIG. 1 includes a seat adjuster 2 to which are attached a slide motor 5 for moving a seat cushion 3 backward and forward, a front vertical motor 6 for moving the front portion of the seat cushion 3 vertically, a rear vertical motor 7 for moving the rear portion of the seat cushion 3 vertically, and a reclining motor 8 for adjusting the inclination angle of the seat back 4. A lumber support motor 9 for rotating a lumber support bar 4a is provided in the seat back 4 of the seat unit 1. Located under the seat cushion 3 are an electronic control unit (ECU) 14 for controlling the drive of the motors 5–9 and wire harness 13 for supplying electric power and control signals to the motors 5–9. Corresponding ones of the motors 5–9, the ECU 14, an external power supply (not shown), and an operation switch 12 are electrically connected to one another via the wire harness 13 and a floor-panel side harness (not shown), so that the motors 5–9 are provided with control signals for adjusting the seat position and adjusting the inclination angle of the seat back from the ECU 14 responsive to the manual operation of the operation switch 12 and with electric power from the external power supply. In the seat unit 1, the wire harness 13 and ECU 14 constitute an electrical equipment module for controlling power supply to and the operation of the motors 5–9 serving as electrical equipment.

According to the above-described seat unit 1, each individual passenger is permitted to adjust the seat position and the inclination angle of the seat back to meet his or her body or the like. However, there is a demand for saving space for the electrically-powered seat unit, as will be explained below.

Recently, to improve the seating comfort, the electrically-powered seat unit has been so constructed that the bottom of the seat cushion moves down when a passenger sits thereon, whereas the space under the seat unit is used as a glove compartment, a blower retaining section, or a retaining section for a car navigation system or an audio visual unit. In this manner, the seat unit is demanded for space saving to effectively use the space thereunder as much as possible. Thus, the ECU adapted to be disposed below the seat unit should be made as thin as possible. However, the conventional seat unit does not sufficiently meet this requirement for the following reason.

As shown in FIG. 2, the wire harness 13 is branched into two on the ECU 14 side and these two branch harnesses are respectively connected to male connectors 13a and 13b. When the connectors 13a and 13b are plugged into two female connectors provided on one side of the ECU 14, the wire harness 13 is electrically connected to the ECU 14. On the opposite side of the ECU, the wire harness 13 is separated into a large number of branch harnesses adapted to be connected via connectors to wire groups (wire harnesses) respectively extending from the external power supply and the motors. A respective branch harness corresponding to each motor includes at least two wires forming a pair of power supply lines. Generally, each branch harness consists of a total of five wires including a control power supply line, a control ground line and a control signal line in addition to the two power supply lines.

On the other hand, the number of motors to be mounted in an electrically-powered seat unit tends to increase to suit the luxury features of the seat unit. In general, for example, five motors are used as in the case of the seat unit 1. As the number of motors increases, the number of wires for supplying electric power and control signals to the motors increases, thus enlarging the outside diameter of the wire harness comprised of those wires.

In the electrically-powered seat unit 1 designed to connect the wire harness 13 to the ECU 14 only on one side of the ECU 14, therefore, the ECU-side connecting portion of the wire harness 13, comprised of a bundle of a very large number of wires, becomes extremely large in outside diameter. This makes it difficult to bend the wire harness 13 so that it is troublesome to lay the wire harness 13 upon installation of the seat unit 1 to the floor panel. Further, the adjuster 2 and the wire harness 13 may interfere with each other, damaging the wires.

Since the thickness of the ECU 14 to which the connectors 13a and 13b are connected inevitably become larger than the outside diameters of these connectors, the ECU 14 become thicker if the outside diameters of the wire harness 13 and the connector become large. For this reason, it is difficult to make the ECU 14 of the seat unit 1 thin.

Since the wire harness 13 is connected only to one side of the ECU 14, the wire harness 13 should be routed around the ECU in connecting the wire harness 13 to the ECU 14. That is, as for a motor located on the side opposite the connector side of the ECU 14, the wire harness to be connected thereto should be routed to the side opposite the connector side of the ECU 14. Therefore, the wire harness becomes longer, causing costs to increase.

Some electrically-powered seat units do not have a control functional component equivalent to the ECU 14 but have an electrical equipment module consisting of a power distribution section (distributing board) which is interposed among the motors 5–9, the external power supply (not shown) and the operation switch 12. In the seat unit of this type, corresponding ones of the motors 5–9, the external power supply and the operation switch 12 are electrically connected via the wire harness and the power distribution section. For example, such a seat unit is arranged to distribute electric power from the external power supply to the required one or ones of the motors 5–9 in response to the manual operation of the operation switch 12.

As in the case of the electrical equipment module having a control functional component (ECU 14) or the electrically-powered seat unit 1 provided with such a module, the aforementioned electrical equipment module essentially consisting of the power distribution section has a specific side thereof to which wire harness connectors are attached, posing such a problem that it is difficult to make these connectors thin and the wire harness becomes long.

FIG. 3 shows one example of the circuit structure of the electrically-powered seat unit shown in FIGS. 1 and 2. This seat unit comprises a control section (ECU) 114 responsive to a signal supplied from an operation switch 124 and motors operable under the control of the control section, and operates to adjust the seat cushion and the seat back. More specifically, there are provided a slide motor 125 for adjusting the fore-and-aft position of the seat cushion, a front vertical motor 127 for adjusting the inclination of the seat surface, a rear vertical motor 126 for adjusting the vertical position of the seat cushion, a reclining motor 128 for adjusting the inclination of the seat back, and a lumber support motor 134 permitting a passenger to make an adjustment to fit his or her hip to the seat.

With regard to power distribution to the motors 125–128 and 134, the electrically-powered seat unit shown in FIG. 3 has a floor connector 111 having one side thereof connected to an external power supply 200 via a wire group 201, and includes joint sections 113a–113d connected via another wire group to the other side of the floor connector 111 and having a power distributing capability, so that electric power supplied from the external power supply to the joint sections 113a–113d via the floor connector 111 may be distributed to the motors 125–128 and 134 via the control section (ECU) 114. The control section 114 is connected to the floor connector 111 and the operation switch 124 via wire groups 202, 203 and is connected to various sensors 121 and 129–133 and a seat heater 123 via wires or wire groups and the joint sections 113a–113d.

Generally, each of the wire groups is constructed in the form of a wire harness consisting of a bundle of wires, through which corresponding ones of the external power supply 200, the floor connector 111, the joint sections 113a–113d, the control section 114 and pieces of electrical equipment (the seat heater 123, the operation switch 124, the sensors 121, 129–133, the motors 125–128, 134) are connected to each another.

Essential components of the electrically-powered seat unit, such as the floor connector 111, the joint sections 113a–113d and the control section 114, are disposed under the seat cushion and wire harnesses are laid around these essential components. Since the laying space under the seat cushion and in the vicinity thereof is narrow, wire laying paths are naturally restricted, so that the wire harnesses are laid by a roundabout route and the outside diameters of the wire harnesses become thick at specific portions thereof. Thus, the wire harnesses are likely to bite or to be caught in the adjuster of the seat unit or in vehicle components therearound, which may cause wire disconnection.

The peripheral components connected to the electrically-powered seat unit via the wire harnesses, such as the external power supply, the motors and the sensors, are disposed at various positions with respect to the seat unit as seen in the lengthwise, widthwise and height directions of the vehicle body. Thus, the laying paths of the wire harnesses which connect the peripheral components to the seat unit are complicated. Particularly, the seat unit shown in FIG. 3 include wire harnesses for connecting the floor connector 111 to the joint sections 113a–113d and to the control section 114, which are located apart form the floor connector, requiring that the ends of those wire harnesses be inserted in a triangular form. A similar end inserting work is carried out, as needed, for the other wire harnesses. In the case of the seat unit shown in FIG. 3, of 49 circuits, 27 circuits, more than a half, are triangular circuits. It is therefore necessary to perform manual assembling (wiring) at the time of producing the wire harnesses, so that the assembling (wiring) work takes times and the end portions of the wire harnesses may be erroneously laid out. Further, the form of the wire harnesses becomes complex, so that their production needs a cost and time.

SUMMARY

An object of the present invention is to provide an electrical equipment module which can reduce the thickness of a module body, and reduce the outside diameters of wire groups and wire harnesses to be connected to the module body, thus facilitating the wire laying work and preventing wire disconnection.

Another object of this invention is to provide an electrical equipment module which reduces the locations of electrical connection established by wire groups and wire harnesses, to thereby facilitate a harness assembling (wiring) work and automated wiring work.

To achieve the above objects, according to one aspect of this invention, an electrical equipment module is provided, which comprises a module body incorporating a power distribution section electrically connected to an external power supply; and at least three wire groups electrically connected to the power distribution section and extending from the module body in different directions. The at least three wire groups are connected at their ends on the side remote from the module body to pieces of electrical equipment. Preferably, each of the at least three wire groups is comprised of a wire harness having a bundle of wires constituting a wire group or a flat cable having wires arranged two-dimensionally.

According to the electrical equipment module of this invention, three or more wire groups, preferably, three or more wire harnesses, extend from the module body in three or more directions different from one another, so that, unlike the conventional electrical equipment module, it is unnecessary to connect one or more wire groups (wire harnesses) only to one side of the module body, making it possible to reduce the number of wires constituting each wire group and reduce the outside diameter of the wire group. This can make the module body thin and facilitates the work of laying the wire groups.

Preferably, the module body is formed into a rectangular parallelepiped shape and has four sides thereof extending substantially perpendicular to one another, and the at least three wire groups extend from different sides of the module body. Alternatively, the module body is formed into a plate shape, and the at least three wire groups extend sideward from a plate surface of the module body. According to the preferred arrangement, at least three wire groups or wire harnesses extend from different sides of the module body or from the module body in directions substantially perpendicular to one another. Therefore, even when pieces of electrical equipment are located at various positions with respect to the electrical equipment module, the electrical connection between the electrical equipment module and the pieces of electrical equipment can be accomplished, without routing the wire groups or wire harnesses around the module body, by causing each of the wire groups or wire harnesses to extend from that side of the module body which is located on the side close to the associated electrical equipment or to extend sideward from that portion of the plate surface of the module body which is close to the associated electrical equipment. This facilitates the work of laying the wire groups or wire harnesses and minimize the lengths of the wire groups or wire harnesses, thus reducing the cost.

Preferably, the module body incorporates a control section electrically connected to the power distribution section, and the control section is connected to at least one of the pieces of electrical equipment via at least one of the at least three wire groups to thereby drivingly control the pieces of electrical equipment. According to this preferred arrangement, it is possible to reduce the outside diameters of the wire groups, e.g., the wire harnesses, of an electrical equipment module having an electrical equipment control function, thus making the module body thin.

Preferably, at least one of the at least three wire groups is provided with connectors at an end thereof disposed on the side remote from the module body. According to this preferred arrangement, the connection between the electrical equipment module and pieces of electrical equipment can be facilitated by means of the connectors provided to the wire groups extending from the pieces of electrical equipment.

Preferably, at least one of the at least three wire groups is provided with connectors at an end thereof disposed on the side close to the module body, and the connectors are adapted to be connected to connectors provided on the module body and electrically connected to the power distribution section or the control section. This preferred arrangement facilitates electric connection between the wire groups to the power distribution section or the control section.

Preferably, the module body is mounted in a body of a vehicle, and the pieces of electrical equipment comprise vehicle-mounted components. This preferred arrangement can provide an electrical equipment module for distributing electric power to vehicle-mounted components and for controlling the drive of these components. In addition, since the module body is thin in thickness, the electrical equipment module can be mounted by effectively using narrow space in the vehicle body.

More preferably, the module body is placed in a component of a vehicular seat, and at least one of the pieces of electrical equipment comprises a motor for driving an adjuster for the vehicular seat. According to this preferred arrangement, an electrical equipment module for distributing electric power to the motor for driving the seat adjuster and for controlling the drive of the motor can be mounted by effectively using narrow space under the seat cushion.

An electrical equipment module according to another aspect of this invention comprises an electric connecting section electrically connected to an external power supply via a wire group, and a module body incorporating a power distribution section electrically connected to pieces of electrical equipment via other wire groups. The electric connecting section and the module body are formed into one piece and electrically connected to each other.

According to the electrical equipment module of this invention, the electric connecting section and the module body are formed into one piece and the electric connecting section and the power distribution section in the module body can be electrically connected beforehand. In particular, at the time of establishing electrical connection between the electric connecting section and the power distribution section, it is unnecessary to carry out a complex wiring work to install the wire groups, extending between these sections, in a triangular form. This makes it possible to simplify a work of assembling (wiring) the electric connecting section and the module body at the time of manufacturing the electrical equipment module, and eliminates the necessity of carrying out on-site work to connect the electric connecting section to the power distribution section by using wire groups or wire harnesses. Since the on-site work to establish the electric connection between the sections is unnecessary, part of the assembling (wiring) work at the time of manufacturing the electrical equipment module can be omitted, thus facilitating the production of the wire groups or automated production thereof and shortening the required manufacturing time. Since the configuration of the wire groups is simplified, a wiring work can be easily, accurately and quickly carried out even in a narrow space, thus simplifying the wiring work.

Preferably, the electric connecting section is electrically connected to at least one of the pieces of electrical equipment. In this case, the electric connecting section is electrically connected to the at least one of the pieces of electrical equipment (e.g., switches and sensors), so that the electric connecting path between the electrical equipment module and at least one of the pieces of electrical equipment becomes more proper and simplified, thus further facilitating the assembling (wiring) work or automated work at the time of manufacturing the electrical equipment module.

Preferably, the module body incorporates a control section electrically connected to the power distribution section or the electric connecting section. The control section is electrically connected to at least one of the pieces of electrical equipment via at least one of the other wire groups and drivingly controls the at least one of the pieces of electrical equipment. In this case, the electric connection between the electric connecting section and the control section of an electrical equipment module having a function to control the drive of electrical equipment, e.g., a motor, can be established in advance directly or via the power distribution section, so that the assembling (wiring) work at the time of manufacturing the electrical equipment module can be easily carried out.

Preferably, the module body is placed in a component of a vehicular seat, and at least one of the pieces of electrical equipment comprises a motor for driving an adjuster for the vehicular seat. According to this preferred arrangement, the wiring work can be performed easily when an electrical equipment module for distributing power to the motor that drives the adjuster for the vehicular seat and for controlling the drive of the motor can be installed in a narrow space under the seat cushion.

Preferably, the module body has a first radio communication section formed integrally therewith and electrically connected to the control section. Signals associated with at least one of the pieces of electrical equipment are exchanged between the first radio communication section and a second radio communication section electrically connected to the at least one of the pieces of electrical equipment. According to this preferred arrangement, part of the electric connections through wire groups between the control section and the pieces of electrical equipment can be established before installing the electrical equipment module, and another part of the electric connections can be eliminated by radio communications. This makes the configuration of the wire groups simplified, and can ensure facilitation and automa-

DETAILED DESCRIPTION

Figure 4:
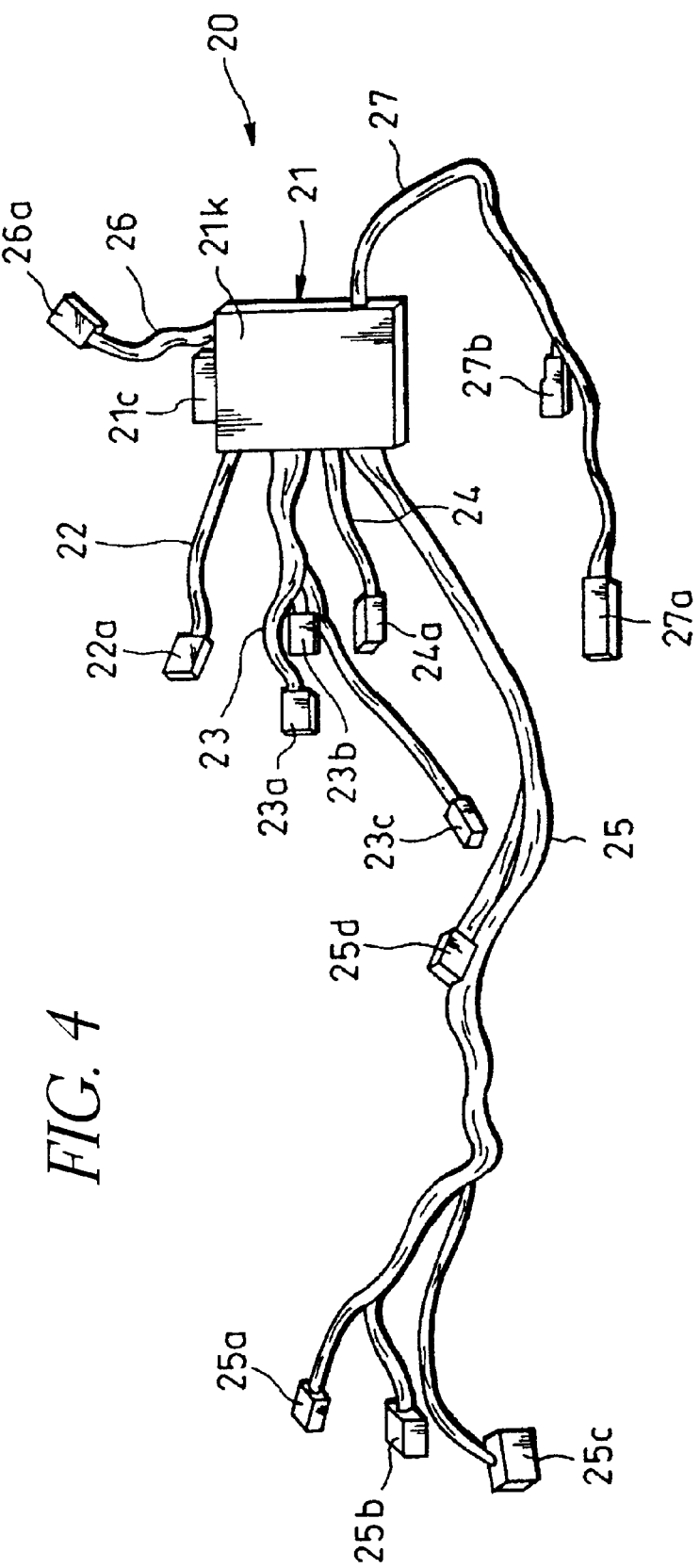
FIG. 4 is a diagram illustrating an electrical equipment module according to a first embodiment of this invention.

Referring now to FIG. 4, an electrical equipment module according to the first embodiment of this invention will be described.

Figure 1:
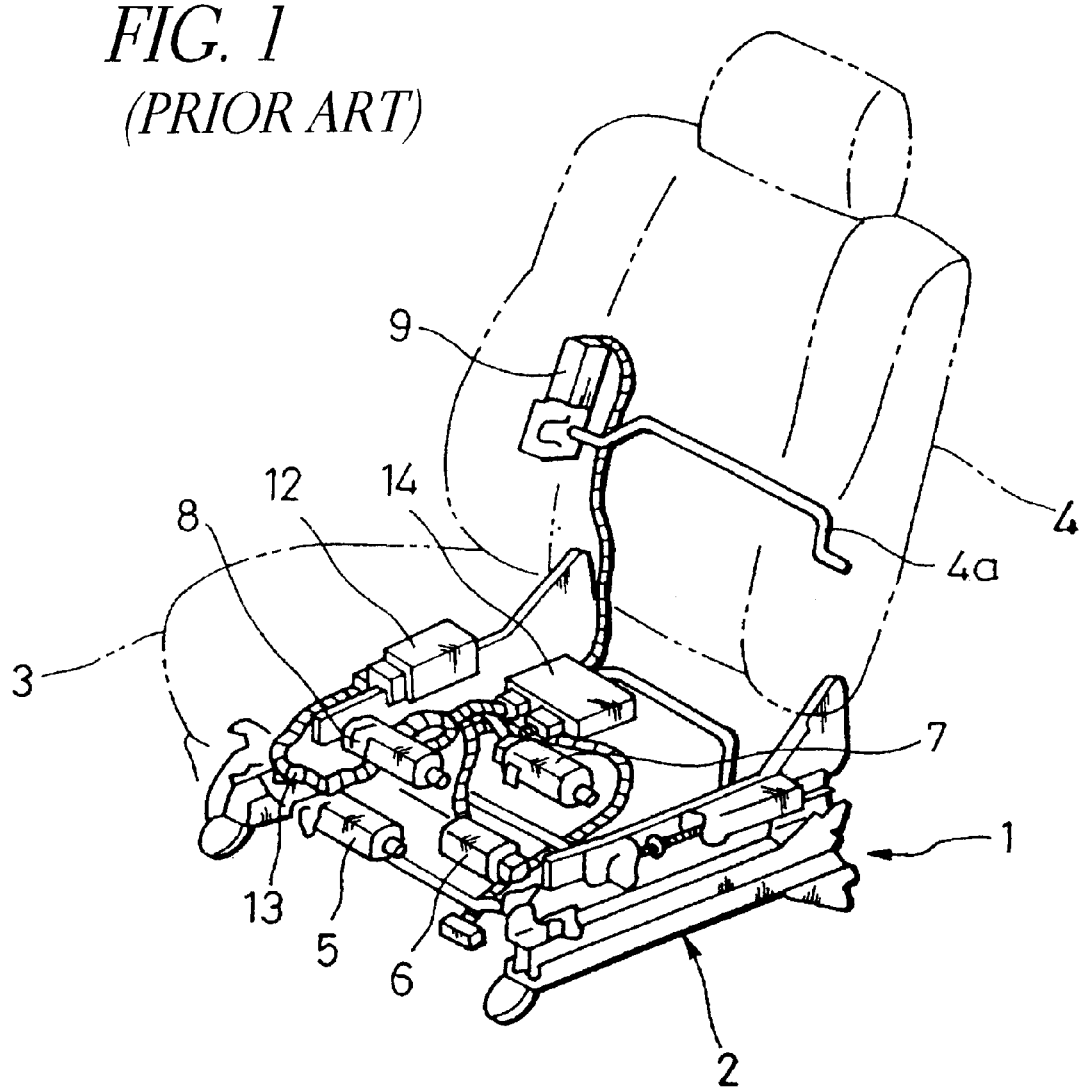
FIG. 1 is a perspective view showing the conventional electric connection established by wire harnesses between an electronic control unit and various kinds of motors in an automotive electrically-powered seat unit.
Figure 2:
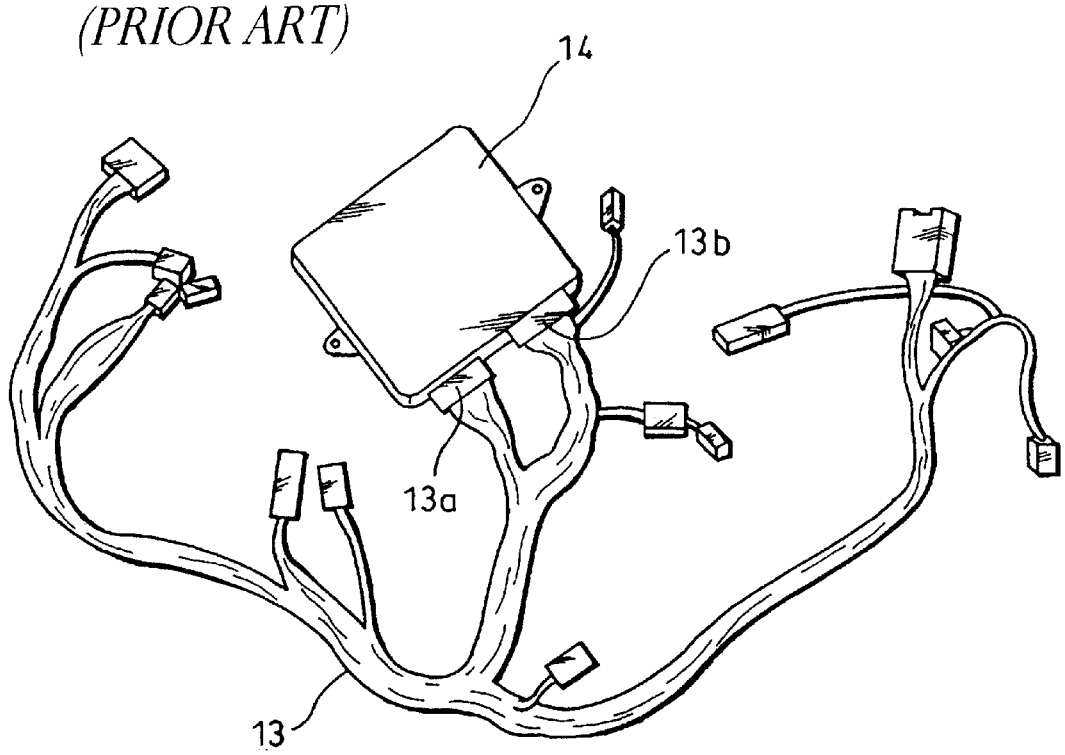
FIG. 2 is a diagram showing the electronic control unit and the wire harnesses shown in FIG. 1.
Figure 3:
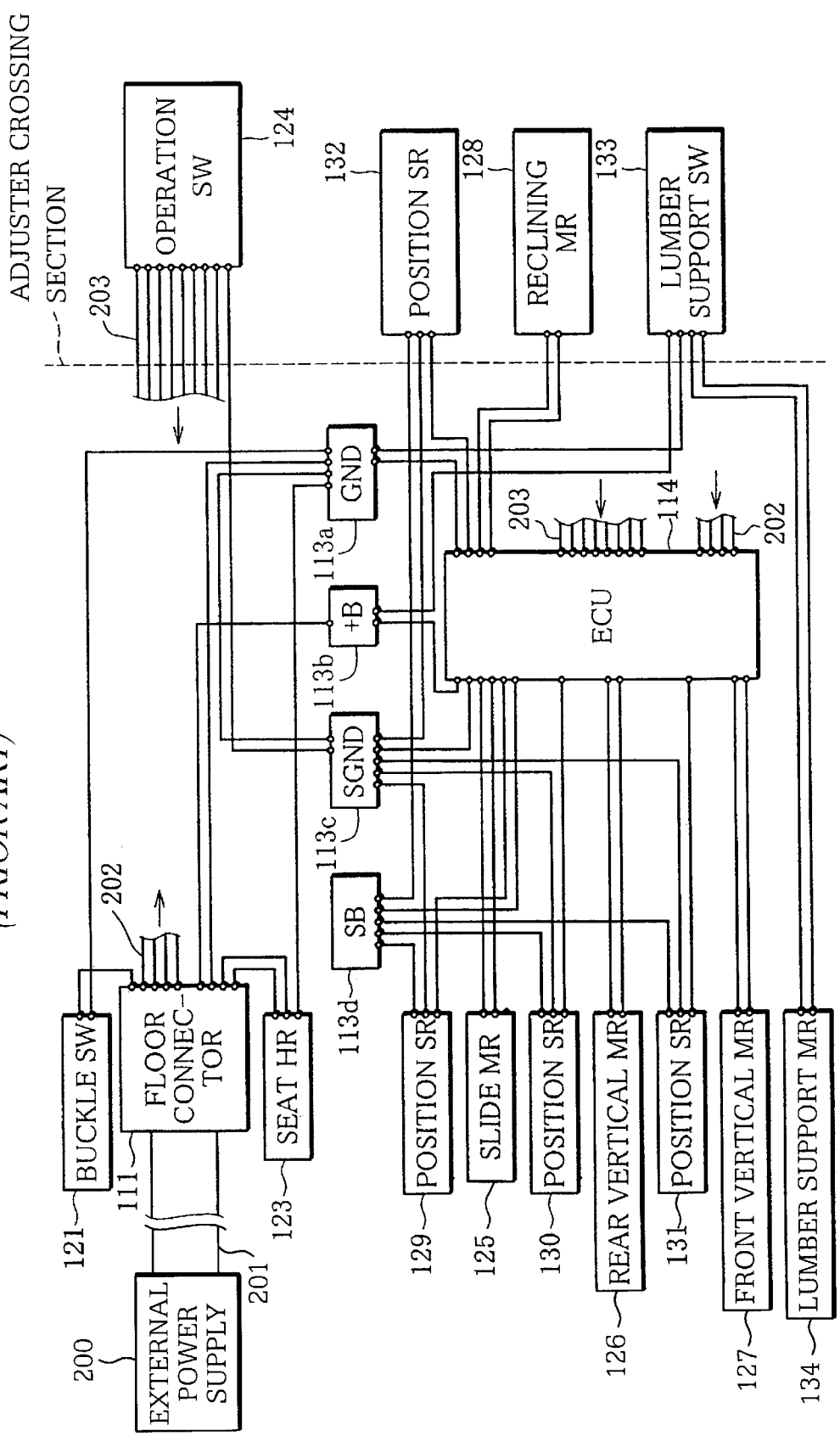
FIG. 3 is a circuit structural diagram depicting the conventional electrically-powered seat unit together with peripheral elements.

An electrical equipment module 20 of this embodiment for controlling the drive of the movable portions of the adjuster of an electrically-powered seat unit via a plurality of motors to adjust a seat-cushion position and reclining angle is mounted on the floor panel of a vehicle under the seat cushion of the seat unit. Since the electrically-powered seat unit on which the electrical equipment module 20 is installed and the motors, switches and sensors that are associated with seat adjustment are basically the same as those shown in FIGS. 1–3, their illustrations and descriptions will be omitted.

An electrical equipment module of this invention indicates the one which has a function of distributing power supplied from an external power supply to pieces of electrical equipment, and preferably has a function of controlling the drive of the pieces of electrical equipment in addition to the power distributing function. In this embodiment, pieces of electrical equipment for use with the electrical equipment module 20 are the motors, switches and sensors that are associated with seat adjustment.

The electrical equipment module 20 has a module body 21 which has a casing 21k fixed to the seat adjuster of the electrically-powered seat unit via brackets. The casing 21k incorporates a printed circuit board (not shown) on which electronic components such as an IC and a relay are mounted. The circuit pattern of the printed circuit board and the electronic components constitute a power distribution section (distributing board) which is electrically connected to an external power supply and which distributes power supplied from the external power supply to the pieces of electrical equipment, and also constitute a control section which is electrically connected to the power distribution section, various switches, sensors and motors and which controls the drive of the motors. The power distribution section corresponds to the floor connector 111 and joint sections 113a–113d shown in FIG. 3 and the control section corresponds to the ECU 114 shown in FIG. 3.

The casing 21k is formed in a thin rectangular parallelepiped having four sides and top and bottom sides which extend perpendicularly to one another. Four wire harnesses 22–25 extend from a first side (the left side in FIG. 4) of the casing 21k, and the proximal ends of the ires that form each harness (wire group) are directly connected to the individual portions of the circuit pattern formed on the printed circuit board by means of soldering, pressure welding terminals, direct connection to the board or the like. One or more connectors are connected to the distal end of each harness on the side remote from the casing.

A first harness 22 is connected via a connector 22a to a slide motor of the electrically-powered seat unit. More specifically, a connector is provided at the distal ends of the wires extending from the slide motor, and one of this connector and the connector 22a is a male connector adapted to be plugged into the other connector of a female type (the same shall apply hereinafter). The distal end side of a second harness 23 is branched into first to third branch harnesses which are respectively connected to a rear vertical position sensor, a front vertical motor and a rear vertical motor of the electrically-powered seat unit via connectors 23a, 23b and 23c. A third harness 24 is connected via a connector 24a to a front vertical position sensor. The distal end side of a fourth harness 25 is branched into first to fourth branch harnesses which are respectively connected to a reclining motor, a reclining position sensor, a power seat switch and a seat heater via connectors 25a–25d.

The extending directions and lengths of the harnesses 22–25 are such that when the module body 21 is attached to the seat adjuster, the positions and orientations of the connectors of the individual harnesses 22–25 substantially match with those of the mating connectors of the pieces of electrical equipment.

The module body 21 is provided at its second side (the far side in FIG. 4), adjacent to its first side, with a connector section 21c adapted to be connected to a connector that is provided at the distal end of a floor harness on the vehicle body side, which harness extends from the external power supply. The connector section 21c has connector contacts thereof respectively connected to corresponding portions of the circuit pattern formed on the printed circuit board in the module body 21. A fifth harness 26 extending from the second side of the module body 21 is connected to a slide position sensor via a connector 26a.

A sixth harness 27 extending from a third side (the right side in FIG. 4), located on the side remote from the first side, of the module body 21 is branched into two. The first and second branch harnesses are respectively connected to a lumber support motor and a buckle switch via connectors 27a and 27b. The extending directions and lengths of the harnesses 26 and 27 are such that when the module body 21 is attached to the electrically-powered seat unit, the orientations and positions of the harnesses 26 and 27 substantially match with those of the mating connectors 26a, 27a, 27b of the pieces of electrical equipment.

As mentioned above, the electrical equipment module 20 has multiple wire harnesses (wire groups) which extend in different directions from the module body 21 connected to the printed circuit board in the module body 21, and the individual wire harnesses or their branch harnesses are connected, via connectors that are provided at their distal ends, to the pieces of electrical equipment associated therewith, such as the motors, switches and sensors. Accordingly, by simply attaching the module body 21, with a predetermined orientation, to a predetermined portion of the seat adjuster of the electrically-powered seat unit, the harnesses 22–27 can extend in such a way that the connectors of the harnesses 22–27 come close to the mating connectors to be connected. Therefore, the pieces of electrical equipment that are arranged at various positions with respect to the electrical equipment module 20 can be connected to the external power supply and the printed circuit board (the power distribution section and the control section) in the module body 21 via the harnesses 22–27 which have the minimum required lengths, and the laying work of the harnesses 22–27 can be carried out accurately and easily.

Since the harnesses 22–27 are directly connected to the printed circuit board in the module body 21 and the module body 21 is provided only with the connector 21c that is used to establish connect between the printed circuit board and the vehicle-side floor harness extending from the external power supply, it is possible to reduce the number of the components and the cost of the electrical equipment module 20 and to make the module body 21 thin. Therefore, the module body 21 is suitable to be installed in the place where space saving is needed, such as under the electrically-powered seat unit. Specifically, as one example, the module body 21 of this embodiment could reduce the number of components by 11% and the cost by 16% and could achieve the size reduction by 51% in terms of the volume ratio, 21% in terms of length and 21% in terms of thickness, as compared with the conventional ECU 14.

The connector 21c for connection to the vehicle-side floor harness should not necessarily be provided on the module body 21, and a harness may be led out from the printed circuit board in the module body 21 and its distal end may be provided with a connector. This can make the module body 21 thinner.

Since the multiple harnesses 22–27 extend from a plurality of sides of the module body 21 in the electrical equipment module 20 of this embodiment, the harnesses 22–27 become smaller in diameter so that, unlike the prior art, the sizes of the harnesses do not become large in the vicinity of the connecting portions to the module body (ECU) 21. Therefore, the harnesses 22–27 do not lose the flexibility, so that the harness laying work is easy to perform and it is unlikely that the harnesses 22–27 are caught in the seat adjuster mechanism or the like of the electrically-powered seat unit, which would cause wire disconnection.

Specifically, as one example, the electrical equipment module 20 according to this embodiment could reduce the assembling time including the laying work by 13% and the number of circuits across the adjuster by 61%, as compared with the conventional ECU 14.

Since the harnesses are led out from the module body 21 in specific directions in such a-way that the connectors of the harnesses 22–27 almost match with the mount positions of pieces of electrical equipment associated therewith, the harnesses 22–27 can be connected to the pieces of electrical equipment in the shortest paths. It is therefore possible to shorten the entire lengths of the wires that constitute the harnesses 22–27. Specifically, as one example, it required only about 40% of the wires of the conventional wire harnesses and the harness cost could be reduced by 40%, thus significantly contributing to cost reduction.

Figure 5:
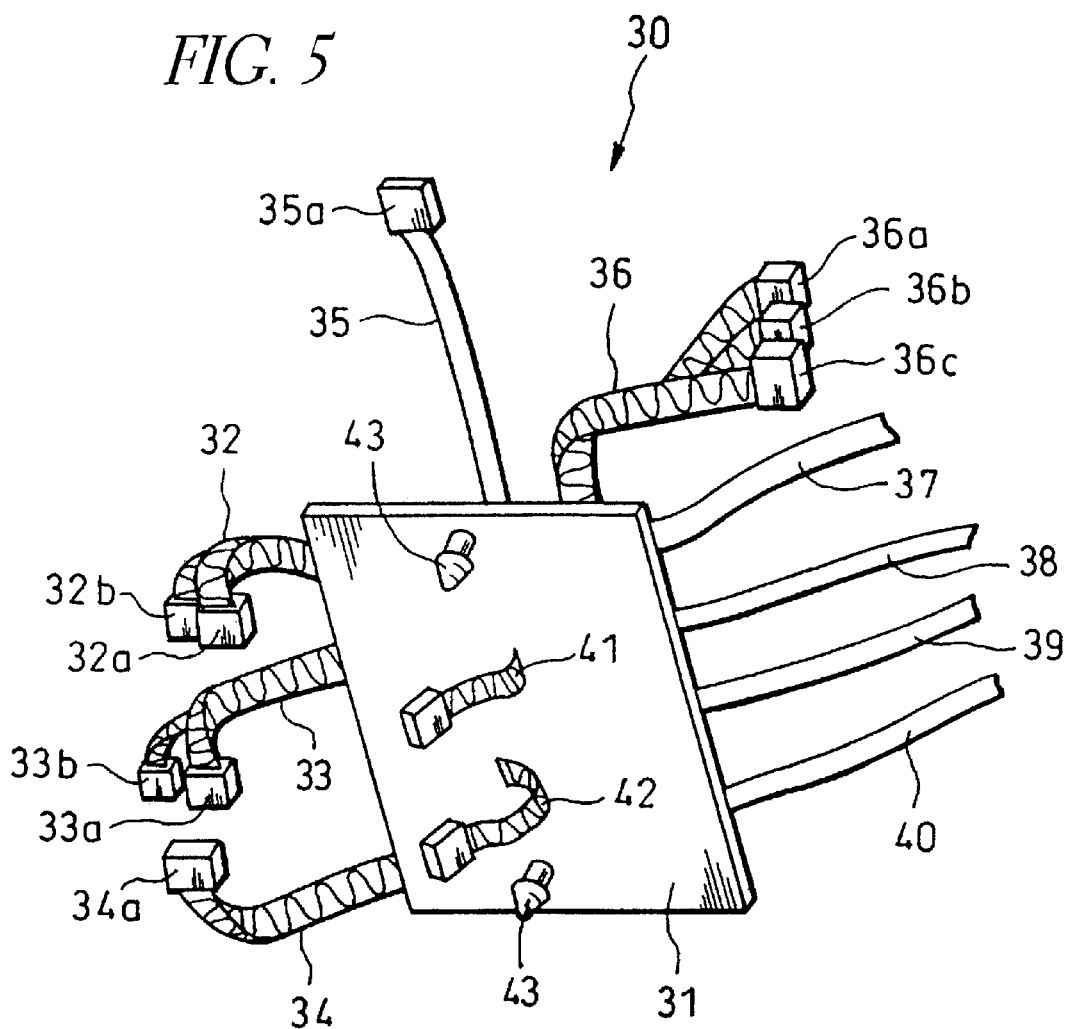
FIG. 5 is a perspective view of an electrical equipment module according to a second embodiment of this invention as seen from the bottom of the module body.

Referring to FIG. 5, an electrical equipment module according to the second embodiment of this invention will be discussed below.

The basic structure of an electrical equipment module 30 of this embodiment is the same as that of the first embodiment, and the description of those elements which are similar to those of the first embodiment will be partly omitted.

As shown in FIG. 5, the electrical equipment module 30 has a module body comprised of a plate 31, in place of the case type module body 21 of the first embodiment. The plate 31 is designed to be attached to the seat adjuster section of the electrically-powered seat unit via a projection 43.

A circuit pattern is formed on the top of the plate 31, and circuit parts such as an IC and a relay are mounted on this circuit pattern, constituting the power distribution section and control section of the electrical equipment module 30. The proximal ends of the wires that constitute wire groups 32–42 are electrically connected to the individual portions of the circuit pattern of the plate 31 by soldering or the like.

The three wire groups 32, 33 and 34 extending sideward (leftward in FIG. 5) from a first long side of the top surface of the plate 31, the wire group 36 extending sideward (upward in FIG. 5) from a first short side of the top surface of the plate and the two wire groups 41 and 42 extending downward from the bottom surface of the plate 31 are formed by flexible flat cables in which wires constituting each wire group are laid two-dimensionally, and are thin and very flexible. The wire group 35 extending sideward from the first short side of the top surface of the plate 31 and four wire groups 37–40 extending sideward (rightward in FIG. 5) from a second long side of the top surface of the plate are formed by wire harnesses each of which is a bundle of wires that constitute a wire group.

More specifically, the flexible flat cable 32 is branched into two, i.e., first and second branch cables which are respectively connected to the front vertical motor and the front vertical position sensor via connectors 32a and 32b. The flexible flat cable 33 is branched into two, i.e., first and second branch cables which are respectively connected to the slide motor and the slide position sensor via connectors 33a and 33b. The flexible flat cable 34 is connected via a connector 34a to the vehicle's floor harness and is adapted to be connected to the external power supply which is in turn connected to the other side of the floor harness. Since the electrically-powered seat unit slides with respect to the vehicle's floor, the flexible flat cable 34 should preferably be provided with a twist-preventing member.

The wire harness 35 is connected via a connector 35a to the power seat switch, and the flexible flat cable 36 is branched into three, i.e., first, second and third branch cables which are respectively connected to the lumber switch, the reclining position sensor and the reclining motor via connectors 36a, 36b and 36c. Further, the wire harnesses 37–40 are connected to the lumber switch, the seat sensor, the heater and the buckle switch via connectors, not shown.

The flexible flat cables 41 and 42 are connected to the rear vertical position sensor and the rear vertical motor, respectively.

Because flexible flat cables are used for some of multiple wire groups 32–42 as mentioned above, the wire groups (flexible flat cables) can be laid without problems in a narrow harness laying space between, for example, the seat cushion and the seat adjuster, making it possible to improve the workability in installing the electrical equipment module 30. As in the case of the first embodiment, the volume of the module body (plate) 31 can be decreased, and the end connectors of the individual wire harnesses 32–42 can be laid in the vicinity of the mating connectors to be connected, making it possible to improve the assembling efficiency of the electrical equipment module 30 and prevent misconnection of the connectors. Further, since the outside diameters and the thicknesses of the wire groups 32–42 can be reduced, the wire groups 32–42 can be prevented from being caught in the adjuster section of the electrically-powered seat unit. As the wire groups 32–42 extend sideward from the plate 31 like the legs of a crab, the wire groups 32–42 can be installed without an undesirable detour and the entire lengths of the wires that constitute the wire groups 32–42 can be shortened, thus contributing to cost reduction.

Specifically, as one example, the module body 31 according to this embodiment could reduce the thickness by 21%, the volume ratio by 21%, the assembling time including the laying work by 20% and the number of circuits crossing the adjuster by 61%, as compared with the conventional ECU 14. Further, it required only about 40% of the wires of the conventional wire harnesses and the harness cost could be reduced by 20%, thus significantly contributing to cost reduction.

Figure 6:
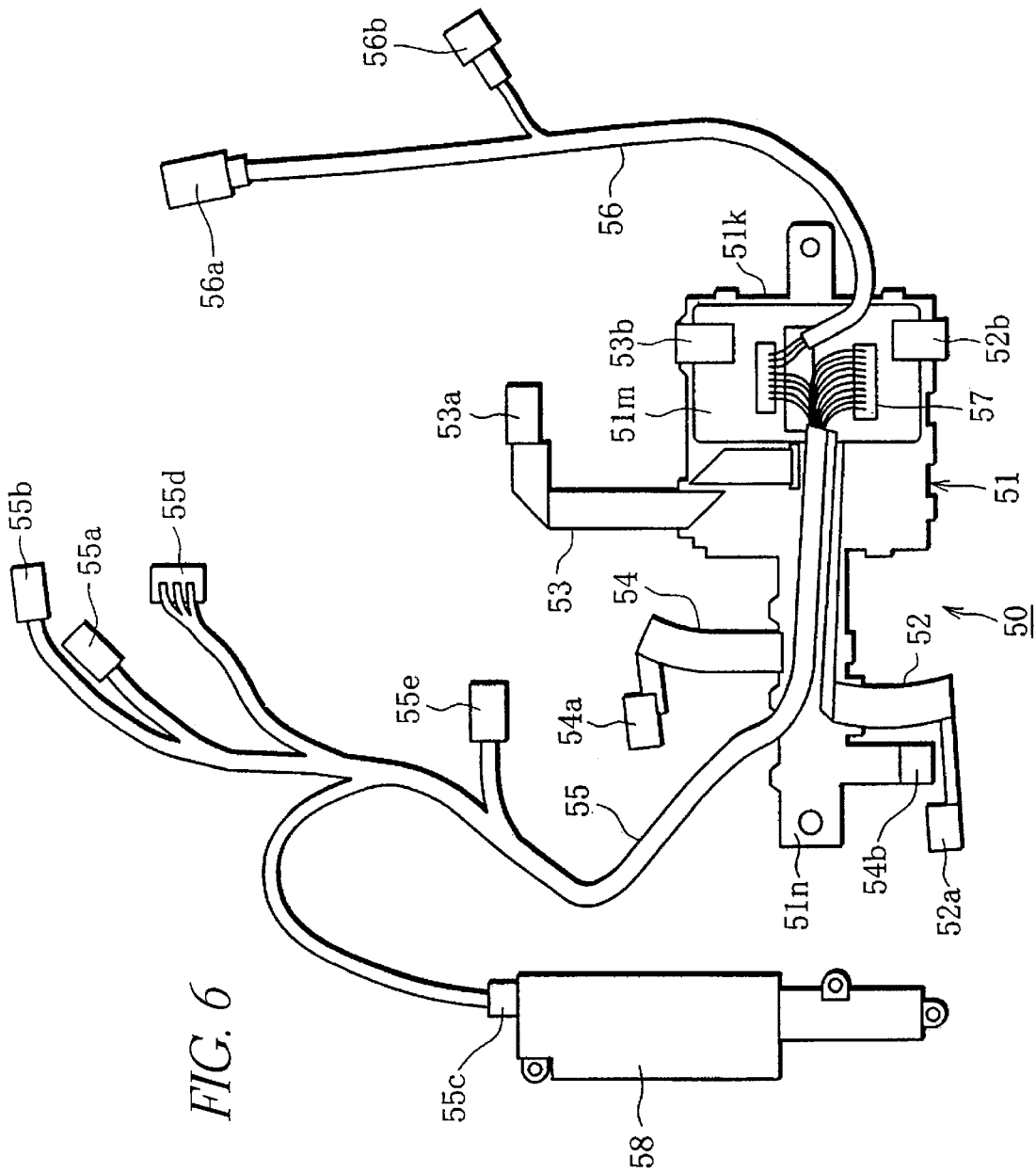
FIG. 6 is a diagram of an electrical equipment module according to a third embodiment of this invention.

Referring to FIG. 6, an electrical equipment module according to the third embodiment of this invention will be discussed below.

An electrical equipment module 50 of this embodiment is adapted to be provided in an electrically-powered seat unit and has a module body 51 having a seat position control capability and a plurality of wire harnesses 52–56 extending from different sides of the module body 51. The wire harnesses 52–54 are comprised of flexible flat cables which are thin and very flexible.

The module body 51 includes a casing which comprises a first casing half 51k and a second casing half (not shown) having substantially the same shape as the first casing half 51k and adapted to be joined thereto. The casing half 51k has a box-like body portion for receiving a printed circuit board 51m, a short bracket extending sideward from the body portion and a long bracket extending in the opposite direction. The module body 51 is secured to the seat adjuster by both brackets.

A circuit pattern is formed on the printed circuit board 51m on which electronic parts, such as an IC and a relay, for memorizing and controlling the posture of the electrically-powered seat unit are mounted. The proximal ends of the wire harnesses 52–56 are connected directly or via a connector 57 attached to the body portion of the casing half 51k to the individual portions of the circuit pattern of the printed circuit board 51m.

Attached to the casing half 51k are three connectors 52b, 53b and 54b which are connected to the circuit pattern of the printed circuit board 51m. The connectors 52b, 53b and 54b are respectively connected to the slide position sensor, the front vertical position sensor and the rear vertical position sensor of the electrically-powered seat unit via wire groups extending from the mating connectors which are to be connected therewith.

The flexible flat cable 52 extends along a bracket 51n from the printed circuit board 51m within the bracket, is bent at a middle portion of the cable, and is led out of the module body 51 from the first side (the downward side in FIG. 6) of the module body 51 via a cable outlet port of the bracket 51n, so that the cable 52 may be connected to the slide motor via a connector 52a at the distal end of the cable.

The three wire harnesses 53–55 extend from the second side (the upward side in FIG. 6) of the module body 51. The flexible flat cable 53 is led out of the module body 51 via a cable outlet port in the body portion of the casing of the module body 51 and is connected to the front vertical motor via a connector 53a at its distal end. The flexible flat cable 54 is led out via a cable outlet port of the casing bracket 51n and is connected at its distal end to the rear vertical motor via a connector 54a. The harness 55 is led out via the cable outlet port of the bracket 51n, and five branch harnesses provided at its distal end are respectively connected via connectors 55a–55e to the reclining motor, the reclining position sensor, a power seat switch 58, the lumber support switch and a seat heater. The harnesses 53–55 have such lengths that when the module body 51 is attached to the electrically-powered seat unit, the orientations and positions of the connectors provided at their distal ends match with those of the mating connectors of the pieces of electrical equipment associated therewith. These harnesses extend in appropriate directions.

The harness 56 extends from the third side (the right side in FIG. 6) of the module body 51. The harness 56 is led out of the module body 51 via a harness outlet port in the body portion of the casing and is connected to the lumber support motor and the buckle switch via connectors 56a and 56b attached to two branch harnesses at its distal end. The lengths and extending directions of the flexible flat cable harnesses 52 and the harness 56 are such that when the module body 51 is attached to the electrically-powered seat unit, the orientations and positions of the connectors 52a, 56a and 56b substantially match with those of the mating connectors.

Since the electrical equipment module 50 according to this invention has the above-described structure, by simply attaching the module body 51, with a predetermined orientation, to a predetermined portion of the seat adjuster section of the electrically-powered seat unit, the harnesses 52–56 are allowed to extend in such a way that the connectors of the harnesses 52–56 come close to the mating connectors to be connected, so that misconnection of the connectors can be prevented.

As the ECU and the wire harnesses of the electrical equipment module 50, unlike the prior art, are not separate from each other, it is possible to reduce the number of components and cost and make the module body 51 thin. Further, the electrical equipment module 50 is suitable to be mounted in the place where space saving is needed, such as under the electrically-powered seat unit. Furthermore, because flexible flat cables are used for some of the wire harnesses 52–56, the wire harnesses can be laid without problems in narrow harness laying space between, for example, the seat cushion and the seat adjuster, making it possible to improve the workability of mounting the electrical equipment module 50.

Specifically, as one example, the module body 51 according to this embodiment could reduce the number of components by 16%, the cost by 27%, the volume by 40%, the thickness by 16% and the weight by 41%, as compared with the conventional ECU 14.

The module body 51 should not necessarily be provided with the connector (not shown) for connection to the vehicle-side floor harness, but, instead of such a connector, a connector attached to the distal end of a harness which is led out from the board in the module body 51 may be used to electrically connect the vehicle-side floor harness to the module body 51. This can make the ECU thinner. As the wire harnesses 52–56 extend from plural sides of the module body 51 like the legs of a crab, unlike the conventional wire harnesses, multiple wires need not be bundled near the connecting portions to the ECU, so that the wire harnesses 52–56 become thinner. Therefore, the wire harnesses 52–56 are unlikely to be caught at the seat adjuster mechanism or the like of the electrically-powered seat unit, whereby wire disconnection can be prevented.

Specifically, as one example, the module body 51 according to this embodiment could reduce the assembling time including the laying work by 57%, the number of circuits by 49%, the number of circuits crossing the adjuster by 39%, the diameter of the adjuster crossing portion by 60% and the production time for the wire harnesses by 50%, as compared with the conventional ECU 14.

Since the harnesses 52–56 are led out from the module body 51 in specific directions in such a way that their connectors substantially match with the mount positions of pieces of electrical equipment to be connected to the connectors, the harnesses 52–56 can be connected to the pieces of electrical equipment in the shortest paths. It is therefore possible to shorten the entire lengths of the wires that constitute the harnesses 52–56.

Specifically, as one example, it required only about 32% of the wires as compared with the conventional ECU 14, and the harness cost could be reduced 50%, thus significantly contributing to cost reduction.

Figure 7:
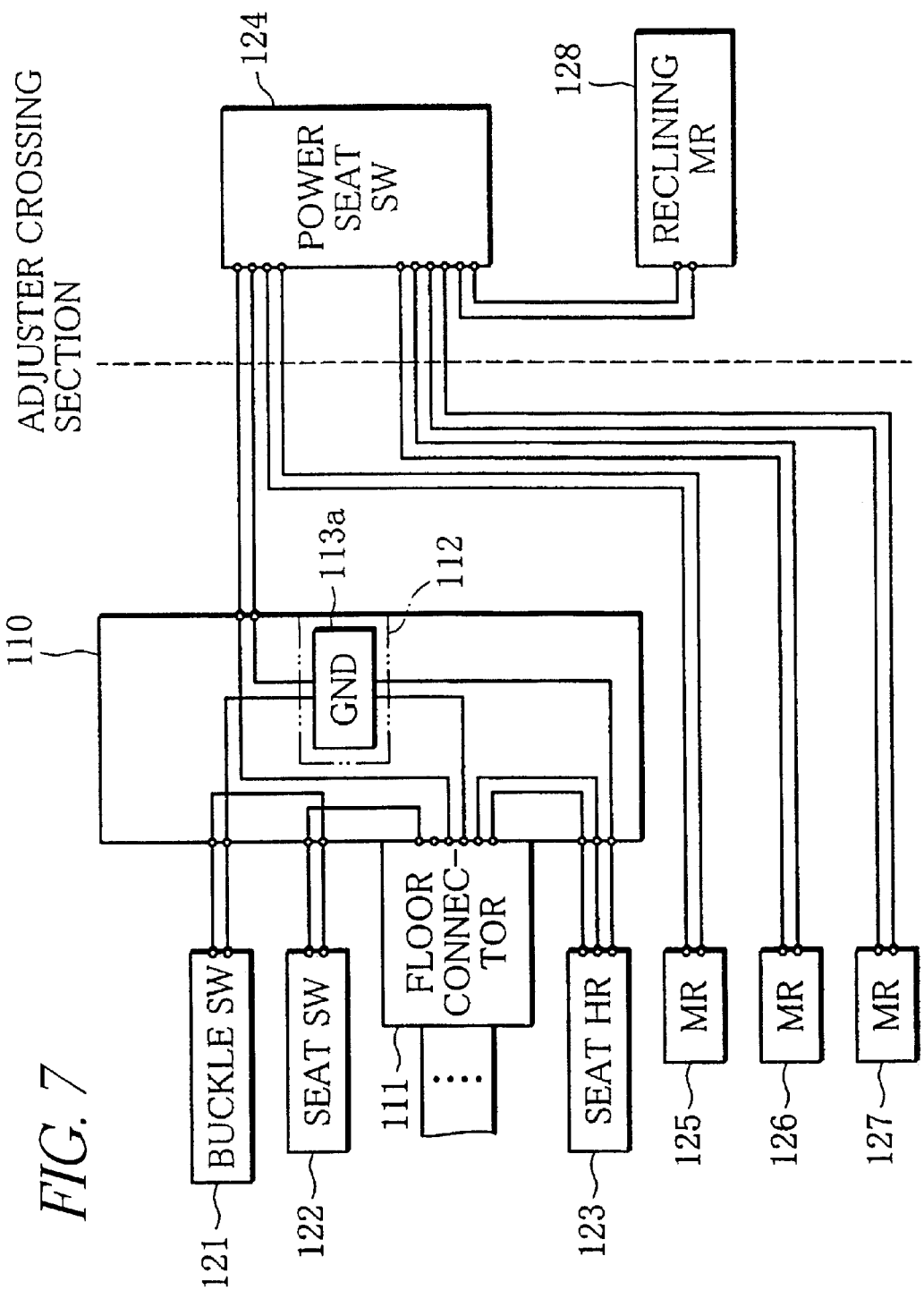
FIG. 7 is a circuit structural diagram depicting an electrical equipment module according to a fourth embodiment of this invention together with peripheral elements.

Referring now to FIG. 7, an electrical equipment module according to the fourth embodiment of this invention will be discussed below.

The electrical equipment module according to this embodiment controls the drive of the motors of an automotive electrically-powered seat unit (corresponding to the unit shown in FIG. 1) to adjust the seat cushion position and the inclination angle of the seat back, and has a module body 110.

This module body 110 has a floor connector 111 to which power supply lines and signal lines extending from a junction box, not shown, are connected, and a joint section 112 which is formed integrally with the connector 111. The joint section 112 has a power distribution section, which is electrically connected to the floor connector 111 and has a function of distributing power to a plurality of ancillaries (pieces of electrical equipment) of the power adjustable sheet unit, such as the motors and heater. The power distribution section in this embodiment comprises a ground power distribution section 113a which integrate the ground sides of a plurality of motors and the heater. The joint section 112 serves as a power distribution section (ground power distribution section 113a), and the floor connector 111 serves as an electric connecting section which is interposed between the external power supply and the module body 110.

The module body 110 has, for example, four-layer printed circuit boards which constitute the floor connector 111 and the joint section 112. The circuit pattern and terminals of the printed circuit board that constitutes the floor connector 111 are electrically connected to the corresponding circuit pattern and terminals of the printed circuit board that constitutes the joint section 112 by wires or wire groups. In this embodiment, the electric connection between the floor connector 111 and the joint section 112 accompanied by a wire laying work has been carried out before the module body 110 is placed in narrow space under the seat, thus facilitating the laying work at the time of mounting the module body 110. Triangular circuit configurations of the wires and wire groups can be reduced by optimizing the relative positions and circuit patterns of the printed circuit boards that constitute the floor connector 111 and the joint section 112.

Connected to the module body 110 are, for example, a buckle switch 121 for the seat belt, a seat sensor 122 for detecting the sitting of a passenger, a seat heater 123, and a power seat switch (operation switch) 124. The power seat switch is connected via a crossing section of the seat adjuster to which the seat cushion and seat back are attached. Those elements 121–124 constitute ancillaries (pieces of electrical equipment).

Motors 125–127 are connected to the power seat switch 124 through the seat adjuster crossing section and a reclining motor 128 which reclines the seat back is connected without going through the seat adjuster crossing section. The motors 125–127 are, for example, the slide motor for sliding the seat backward and forward, and the front vertical motor and rear vertical motor which move the seat vertically or recline it. These three motors are placed under the seat, together with the module body 110 or the like.

Since the triangular circuits are provided in the module body having the floor connector and the joint section which are formed in one piece as described above, the wiring structure between the module body 110 and ancillaries arranged therearound is simplified and the outside diameters of the harnesses for electric connection therebetween can be made smaller.

The thus simplified circuit structures and reduced harness dimensions can realize machine-based automation of harness production process. A conventional process comprises a cut and peel step of cutting a wire into a predetermined length and peeling the sheath of the tip of each wire, a joint producing step of gathering those lines which are to be connected to the joint section and welding them, a pre-assembling step of assembling each of several sub-structures separated in advance from a complex wiring structure to which three or more circuits are to be connected, a terminal inserting step of inserting terminals into the separated sub-structures, an assembling (wiring) step of assembling the sub-structures arranged on a pattern to obtain the complex wiring structure, a component attaching step of attaching exterior components, such as a tube, tape and the like to the assembled wiring structure, and an inspection step of checking the assembled structure. Of the production process, the cut and peel step is automated using a machine, but the other steps are mostly done manually due to the complexity of the wiring structure or the like. This makes the production time longer and prevents an improvement on the productivity.

On the contrary, according to the harness production process for the electrical equipment module of this embodiment having the joint section 112 and the floor connector 111 formed into one piece, the need for the joint producing step is eliminated. Since the wiring structure of this electrical equipment module is simple, the pre-assembling step and the terminal inserting step can be automated, and the assembling step of arranging on a pattern becomes unnecessary. Further, the tube inserting work in the component attaching step can also be automated, and the inspection step can be done by carrying out an end-to-end conductive test of the harnesses, for example. Thus, the time needed for producing the harnesses can be shortened to a half of the conventional time. In consideration of the automation that significantly reduces the defect ratio of the generation of defects, the productivity of the harnesses is improved to more than double. That is, it is possible to improve the quality of the harnesses and reduce the cost.

Further, the simplified wiring structure reduces the number of wires that constitute the harnesses, thus making the harnesses lighter and compact. This facilitates the harness laying work in the narrow space under the seat or in the vicinity thereof, improves the assembling efficiency and can shorten the required time for wiring. As the sizes of the harnesses become smaller, it is possible to prevent the harnesses from being caught in the seat adjuster crossing section.

Figure 8:
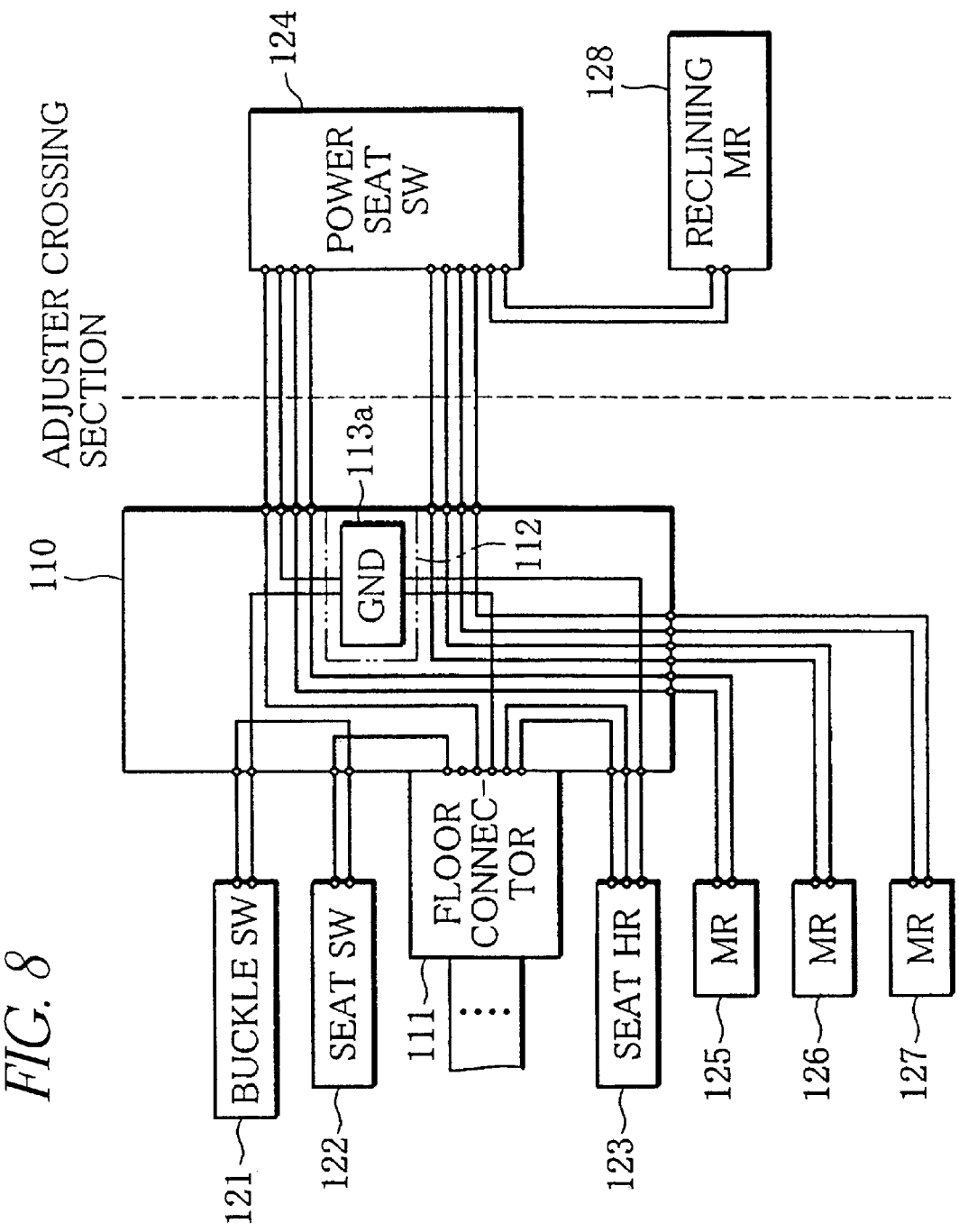
FIG. 8 is a circuit structural diagram of an electrical equipment module according to a fifth embodiment of this invention.

Referring to FIG. 8, an electrical equipment module according to the fifth embodiment of this invention will be discussed below.

The electrical equipment module of this embodiment is basically the same as that of the fourth embodiment but differs from the fourth embodiment in that the motors 125–127 are electrically connected to the power seat switch 124 via the module body 110.

That is, the module body 110 is provided with interconnecting lines that connect the motors 125–127 to the power seat switch 124. The interconnecting lines in this module body 110 cooperate with the interconnecting lines that run between the switch 124 and a connector 110 and between the connector 110 and the motors 125–127, to constitute a motor drive power circuit. Various kinds of switch circuits of the motor drive power circuit are turned on or off in accordance with the operation positions of various operation sections of the power seat switch 124, selectively allowing power supply to the individual motors 125–127.

As understood from the foregoing description, the electrical equipment module of this embodiment, having a floor connector and a joint section integrated therewith, produce advantages similar to those of the fourth embodiment. In addition, this embodiment having interconnecting lines that connect the motors 125–127 to the operation switch 124 can eliminate part of wiring that connects between the ancillaries.

Figure 9:
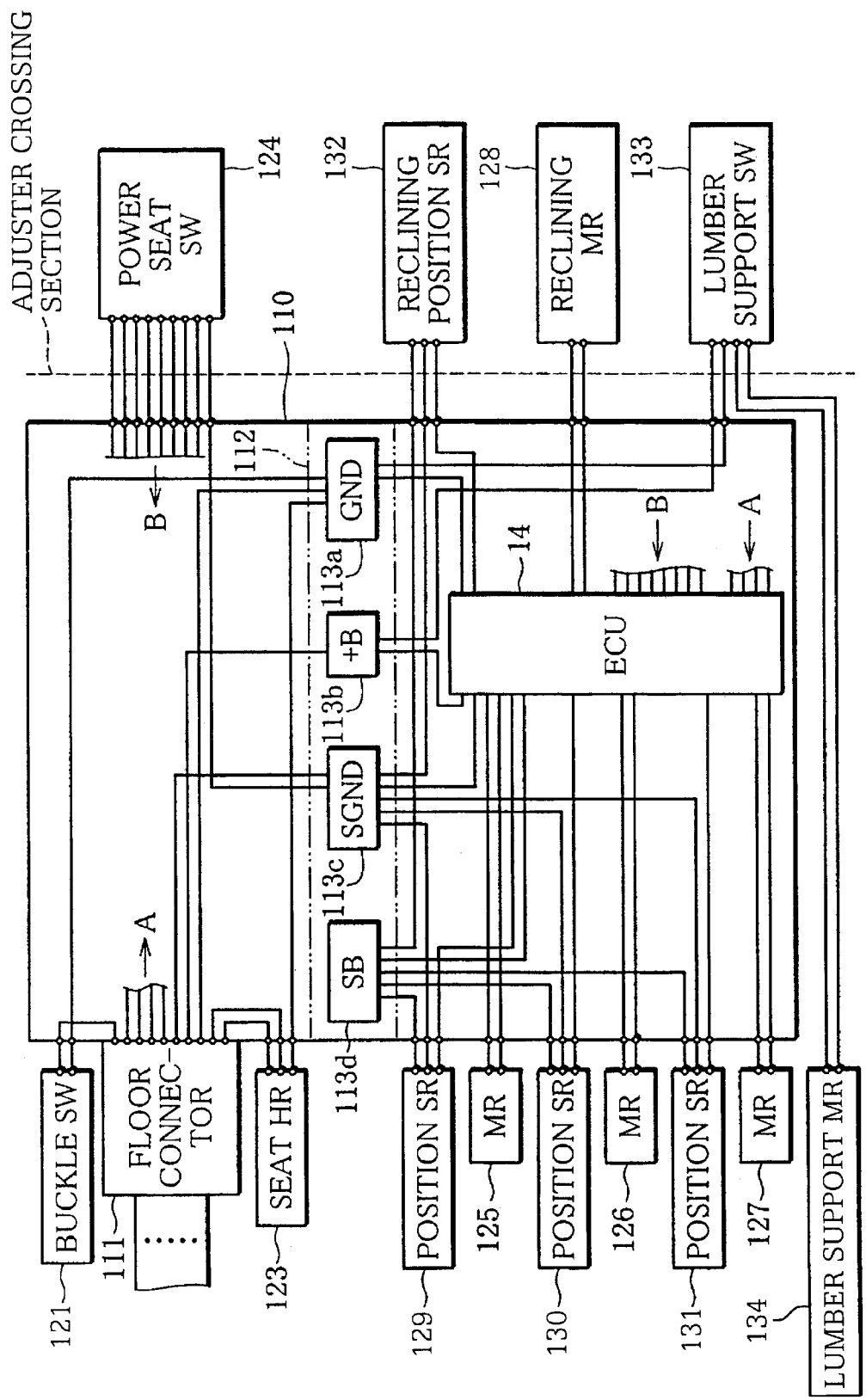
FIG. 9 is a circuit structural diagram of an electrical equipment module according to a sixth embodiment.

Referring now to FIG. 9, an electrical equipment module according to the sixth embodiment of this invention will be described.

The module body 110 of this embodiment has a control section (ECU) 114 for controlling the operations of the ancillaries, in addition to the floor connector (electric connecting section) 111 and the joint section 112. The ECU 114 is integrated with the floor connector 111 and the joint section 112. In addition to the ground power distribution section 113a, the joint section 112 comprises a power distribution section 113b for distributing power from a battery, a ground power distribution section 113c for control, and a power distribution section 113d for distributing control power generated by the ECU 114.

The floor connector 111 and the joint section 112 are connected by the interconnecting lines that run between the floor connector 111 and the power distribution sections 113a–113c in the joint section 112, and the floor connector 111 and the ECU 114 are connected by interconnecting lines A that run therebetween. The joint section 112 and the ECU 114 are connected by the interconnecting lines extending between the ECU 114 and the power distribution sections 113a–113d in the joint section 112. The ECU 114 and the power seat switch 124 are connected by interconnecting lines B extending therebetween.

In the module body 110, the configurations of the interconnecting lines that connect the associated ones of the floor connector 111, the joint section 112 and the ECU 114, especially, the laying paths of the wires or wire groups, become complex and three-dimensional. In this respect, the elements 111, 112 and 114 are provided on a plurality of boards laid hierarchically in the module body 110 so that the complex electric connection among those elements can be done relatively easily (the same shall apply in the subsequent embodiments). Since the complicated interconnecting work in the electrical equipment module 110 can be completed before the installation of the electrical equipment module, only the wire groups that connect the module body 110 to the ancillaries 121, 123–133 are required to be laid out at the time of installation of the electrical equipment module, whereby the wiring work is simplified.

The ancillaries 129–131 are, for example, position sensors, which include sensors for detecting the fore-and-aft position, the vertical position and the reclined position of the seat, and are installed under the seat together with the electrical equipment module. The ancillaries 132 and 133 are connected to the module body 110 via the seat adjuster crossing section. The ancillary 132 is, for example, the reclining position sensor for detecting the reclining of the seat back, and the ancillary 133 is, for example, the lumber support switch.

The lumber support switch 133 is connected to a motor 134 via the seat adjuster crossing section. The motor 134, comprised of a lumber support motor for moving the lower portion of the seat to and fro, is placed in the seat back.

As described above, the electrical equipment module of this embodiment has the floor connector 111, the joint section 112 and the ECU 114 which are formed into one piece and hence can demonstrate advantages similar to those of the fourth embodiment. Because this electrical equipment module has the ECU 114 installed integrally with the floor connector 111 and the joint section 112, even when the interconnection structure among the elements 111, 112 and 114 is complex, such a complex interconnection structure can be provided in the module body 110, whereby the work of laying the harnesses that connect the electrical equipment module to the ancillaries (pieces of electrical equipment) can be simplified, and the sizes of the harnesses can be reduced, thus preventing wire disconnection.

Although the lumber support switch is directly connected to the lumber support motor in this embodiment, this invention is not limited to such an arrangement but the switches and motor may be connected via the ECU. In this case, the structure of the interconnecting lines used for the electric connection between the lumber support switch and motor (more generally, the electric connection between ancillaries) can be simplified and the assembling efficiency can be improved.

Figure 10:
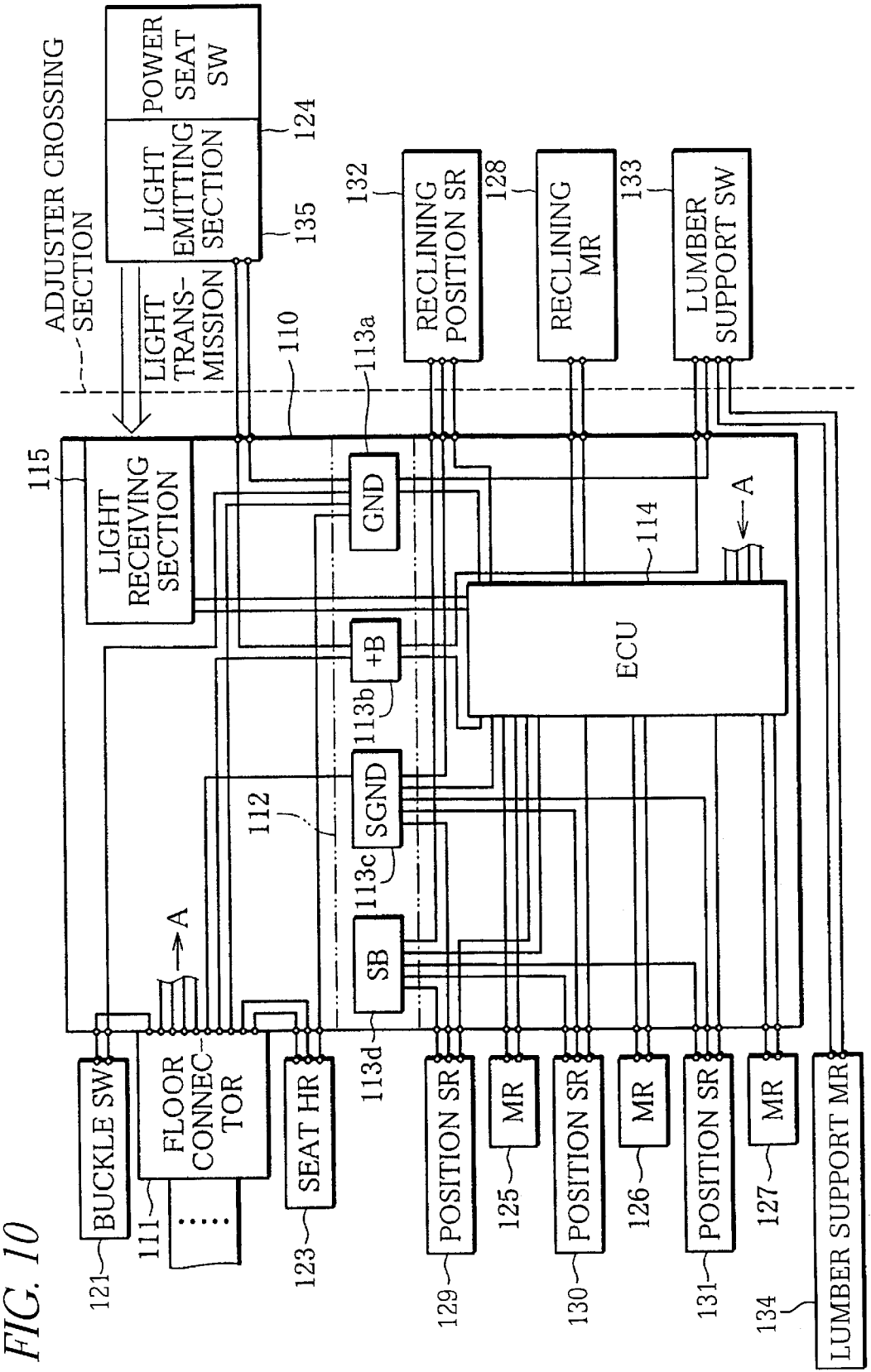
FIG. 10 is a circuit structural diagram of an electrical equipment module according to a seventh embodiment.

FIG. 10 illustrates an electrical equipment module according to the seventh embodiment of this invention.

The electrical equipment module of this embodiment basically has the same structure as that of the sixth embodiment but differs from the sixth embodiment in that it has a light receiving section 115 for receiving an optical signal, in addition to the floor connector 111, the joint section 112 and the ECU 114. The light receiving section 115 is formed integrally with the floor connector 111, the joint section 112 and the ECU 114, and receives an optical signal transmitted from a light emitting section 135 of the power seat switch 124. That is, the light receiving section 115 and the light emitting section 135 constitute a radio communications section which sends and receives signals associated with electrical equipment (the switch 124 here). The light receiving section 115 is electrically connected to the ECU 114 by three-dimensional interconnecting lines and the light emitting section 135 is electrically connected to the joint section 112. The elements 111, 112, 114 and 115 are provided on a plurality of boards laid hierarchically in the module body 110 so that the complex electric connection among those elements can be done relatively easily (the same shall apply in the subsequent embodiments).

Although, in the module body 110, the structures of the interconnecting lines that connect the associated ones of the floor connector 111, the joint section 112, the ECU 114 and the light receiving section 115, especially, the laying paths of the wires or wire groups, become complex and three-dimensional, the complicated interconnecting work in the electrical equipment module 110 can be completed before installing the electrical equipment module. Thus, the wire groups that connect the module body 110, the ancillaries 121, 123–133 and the light emitting section 135 have only to be laid out at the time of installing the electrical equipment module, simplifying the laying work. Further, it is possible to eliminate the signal lines that connect the module body 110 to the power seat switch 124, thus reducing the size of the harnesses.

As described above, the electrical equipment module of this embodiment has the floor connector 111, the joint section 112 and the ECU 114 integrated with one another and can demonstrate advantages similar to those of the fifth embodiment. Because the module body 110 has the light receiving section 115 electrically connected to the ECU 114 and exchanges multiplexed signals with the light emitting section 135 on the switch 124 side by means of an optical transmission system, it is possible to eliminate the wire groups that connect the ECU 114 to the switch 124. Further, the structure of the interconnecting lines that connect the module body 110 to the ancillaries is simplified, whereby the line size of the harnesses can be made smaller.

Although the foregoing description of this embodiment has been given of the case where radio communications by light transmission are performed, this invention is not limited thereto, but a radio communications section which transmits, for example, weak radio waves may be used.

Figure 11:
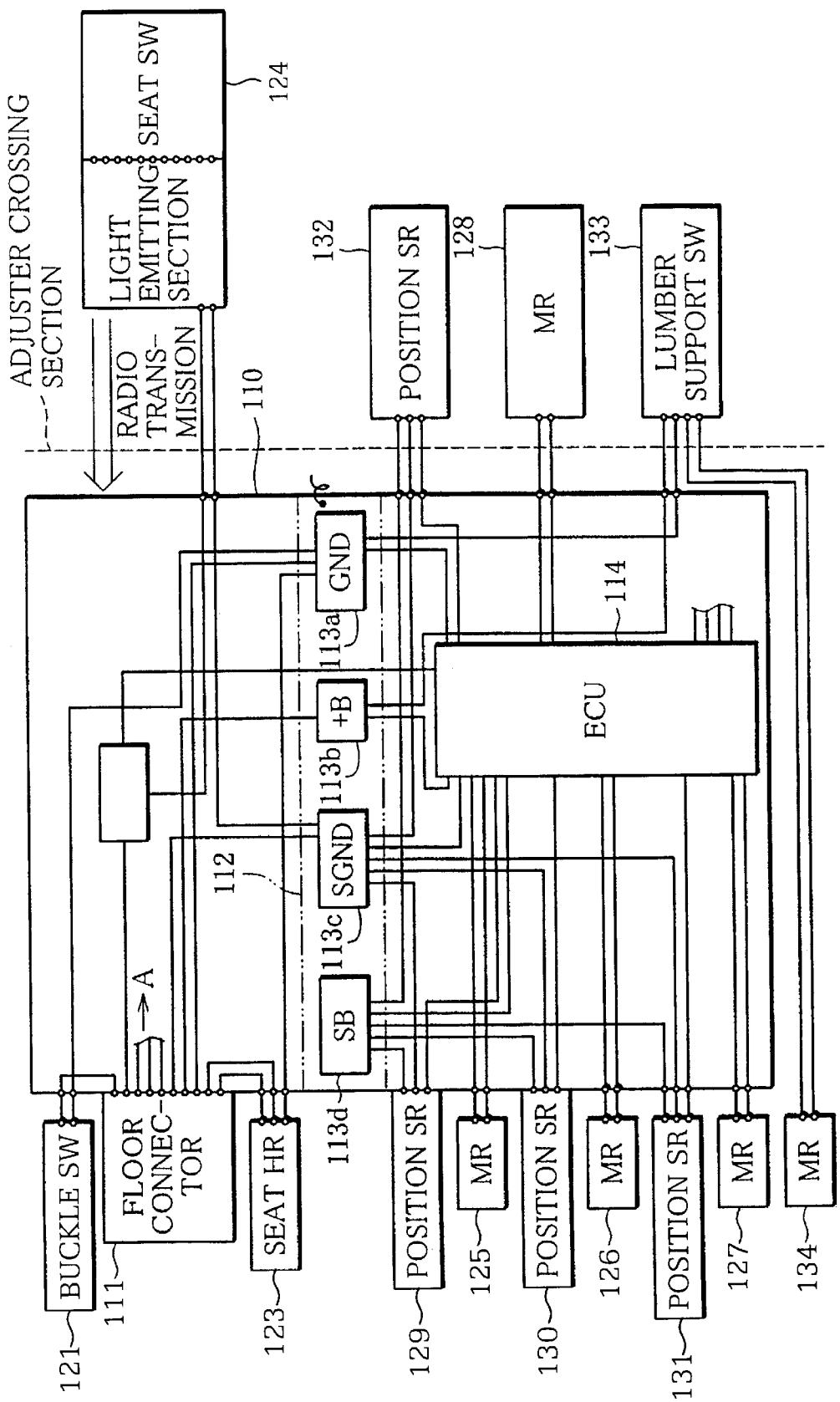
FIG. 11 is a circuit structural diagram of an electrical equipment module according to an eighth embodiment.

Referring to FIG. 11, an electrical equipment module according to the eighth embodiment of this invention will be discussed below.

The electrical equipment module of this embodiment is basically the same as that of the seventh embodiment (the light receiving section is not illustrated in FIG. 11), but differs from the seventh embodiment in that the module body 110 is integrated with a slide position sensor connector 129 and a rear vertical position sensor connector 130. In this embodiment, it is therefore possible to eliminate the interconnecting lines between the module body 110 and the slide position sensor connector 129 and the rear vertical position sensor connector 130.

Specifically, as one example, the electrical equipment module according to this embodiment could reduce the wire-harness producing time by 50%, the number of circuits by 49%, the weight by 41%, the assembling time including the laying work by 57%, the number of circuits crossing the adjuster by 39%, and the diameter of the adjuster crossing portion by 60%, as compared with the prior art. It was also possible to reduce the cost by 27%, the number of components by 16%, the volume by 40%, and the thickness by 16%. Further, it required only about 32% of the wires as compared with the conventional wire harnesses, and the harness cost could be reduced 50%, thus significantly contributing to cost reduction.

Figure 12:
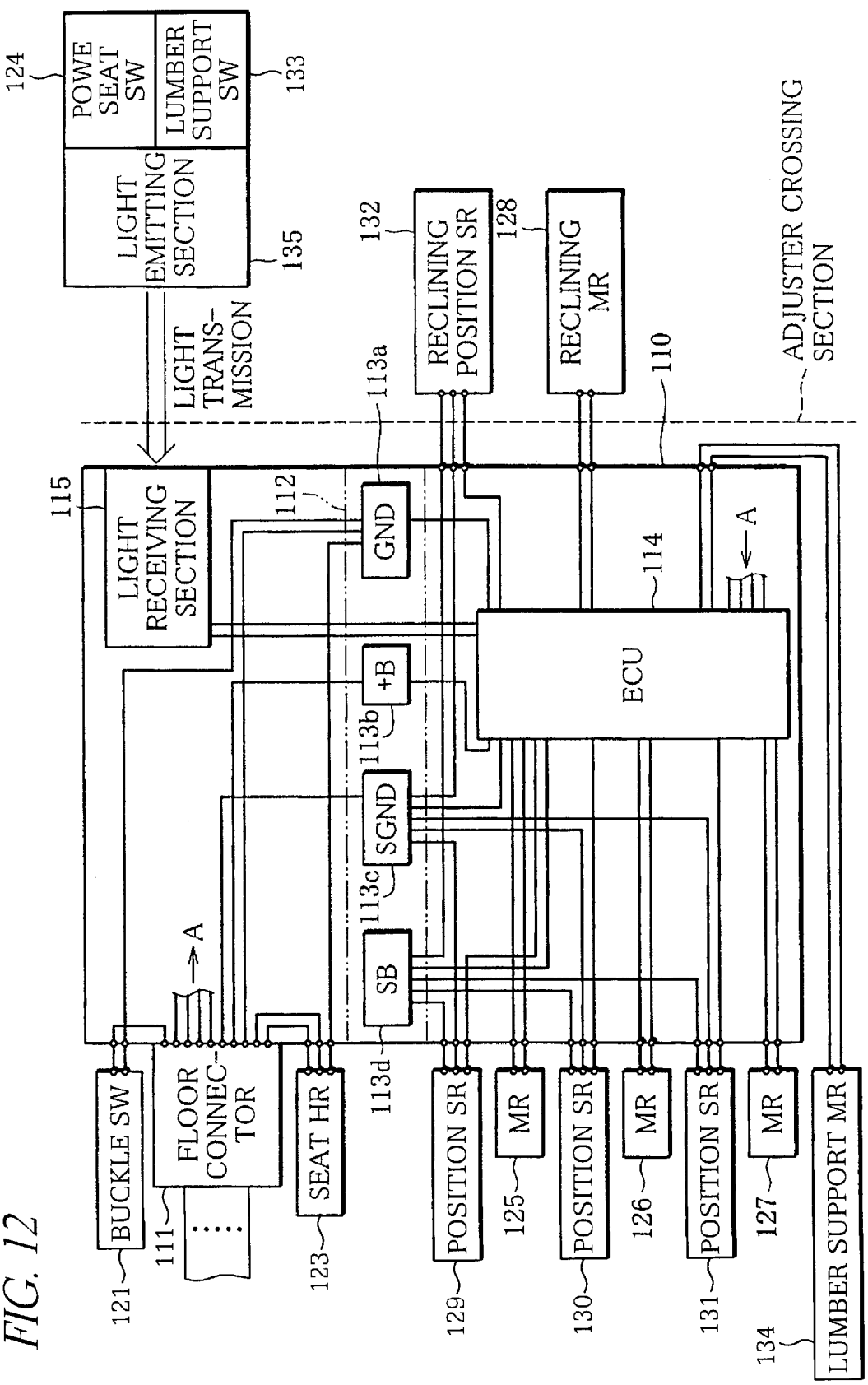
FIG. 12 is a circuit structural diagram of an electrical equipment module according to a ninth embodiment.

Referring to FIG. 12, an electrical equipment module according to the ninth embodiment of this invention will be explained below.

In this embodiment, a battery (not shown) is used as the power supply for the light emitting section 135 to which the power seat switch 124 and the lumber support switch 133 are connected. The light emitting section 135 transmits optical signals, corresponding to multiplexed signals supplied from the switches 124 and 133, to the light receiving section 115. The lumber support motor 134 is electrically connected to the ECU 114. In this manner, the complicated interconnecting lines that connect the associated ones of the floor connector 111, the joint section 112, the ECU 114 and the light receiving section 115 are provided in the module body 110, thus making it possible to simplify the structure of the interconnecting lines that connect the module body 110 to the ancillaries 121, 123–134 and to eliminate the signal lines that connect the module body 110 to the power seat switch 124 and the lumber support switch 133.

As apparent from the above, the electrical equipment module of this embodiment can demonstrate advantages similar to those of the seventh embodiment. Moreover, since the multiplexed signals supplied from the plurality of switches 124, 133 are transmitted by use of an optical transmission system, it is possible to eliminate the signal lines that connect the module body 110 to the switch 133, thus making the harness size smaller.

Figure 13:
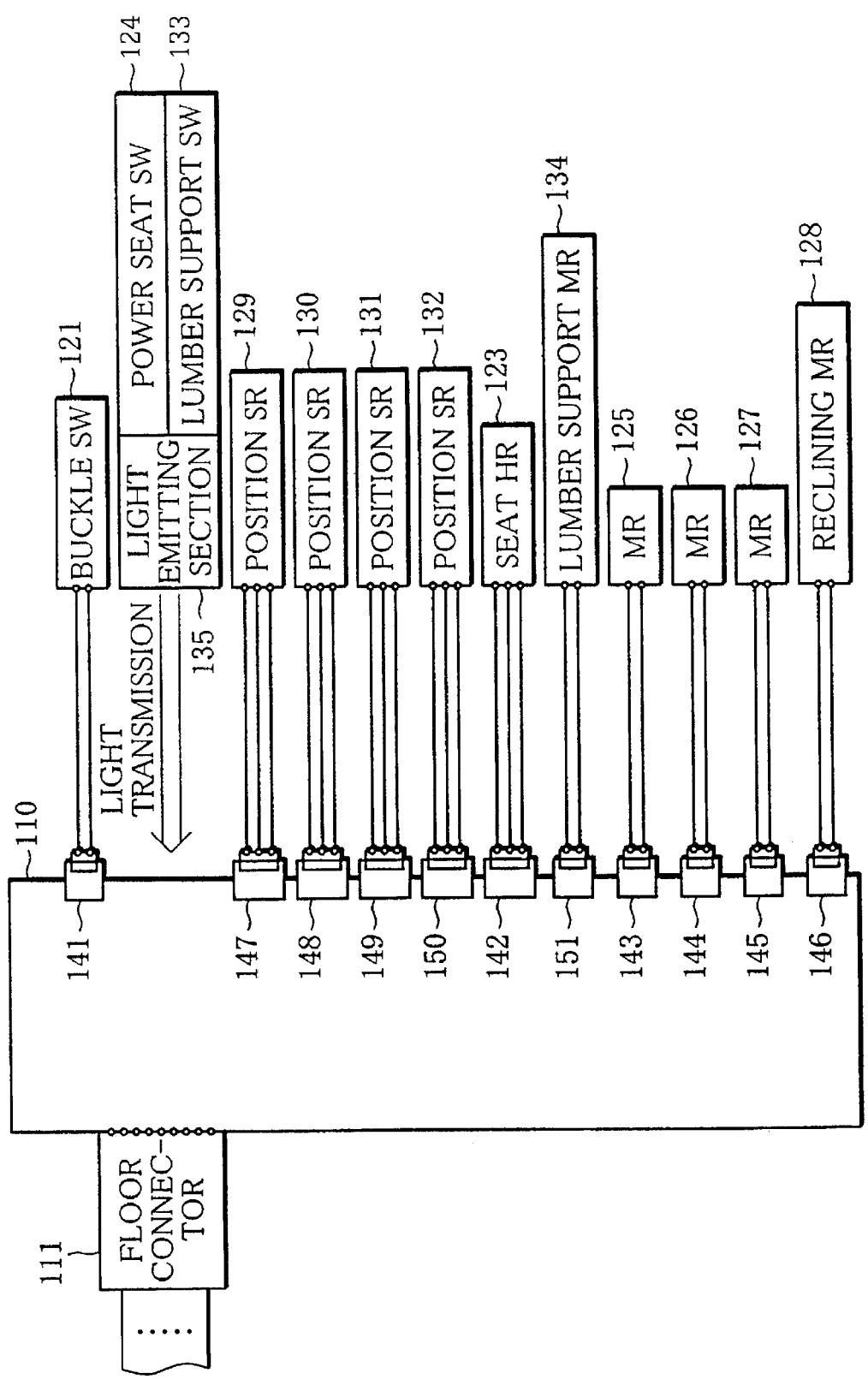
FIG. 13 is a circuit structural diagram of an electrical equipment module according to a tenth embodiment.

Referring to FIG. 13, an electrical equipment module according to the tenth embodiment of this invention will be described below.

The electrical equipment module of this embodiment has the same internal structure as that of the ninth embodiment but differs in that the module body 110 is provided with connectors 141–151 into which connectors, provided at the distal ends of the harnesses extending from ancillaries 121, 123 and 125–132, are adapted to be plugged.

The electrical equipment module of this embodiment can demonstrate advantages similar to those of the ninth embodiment and can disconnect the electric connection between the module body 110 and the ancillaries 121, 123 and 125–132, ancillary by ancillary, thus facilitating the maintenance.

This invention is not limited to the above-described embodiments, but can be modified in various forms without departing from the scope of this invention.

For instance, the electrical equipment modules according to the first to tenth embodiments can be combined in various ways. For example, in the electrical equipment module shown in FIG. 6 and characterized by multiple wire harnesses or flat cables extending from different sides of the module body, the floor connector 111 shown in FIG. 7 can be constituted by one of the connectors 52b, 53b and 54b attached to the module body 51. In this case, an electrical equipment module having features of the third and fourth embodiments of this invention is provided.

The electrical equipment module of this invention is applicable not only to an electrically-powered seat unit for a vehicle as in the embodiments, but also to other parts, such as the instrument panel, side panel, front panel or the like of a vehicle, in which restrictions are imposed on the thickness of the electrical equipment module attached thereto. The electrical equipment module of this invention may be used for a massage seat or the like for home use. The electrically-powered seat unit in this invention includes a child seat.

In the embodiments, it is not essential to accommodate the ECU having a control function in the module body. The module body may be provided with only a distributing board (power distribution section) for turning on and off the switch elements in an electric circuit or having a power distributing function.

Further, the extending direction and extending length of each harness are not limited to those illustrated in the diagrams of the embodiments, but may be modified in various ways in accordance with the layout of pieces of electrical equipment to which the individual harnesses are connected.

The electrical equipment module of this invention can be flexibly adapted for each type of vehicle. That is, the detailed structure of the electrical equipment module can be modified in various ways so as to be adapted to the specifications of a vehicle to which the electrical equipment module is mounted.

Flat cables other than ordinary sheathed wires or harnesses having a bundle of those wires may be used in establishing electrically connection between the electrical equipment module of this invention to ancillaries. In this case, further space saving is possible.

The electrically-powered seat unit according to this invention is not limited to a use in a vehicular seat, but can be adapted to, for example, the seat of a massaging machine, the seats in an airplane and so forth.

What is claimed is:

1. An electrical equipment module, comprising:
   a module body incorporating a power distribution section electrically connected to an external power supply; and
   at least three wire groups electrically connected to said power distribution section and each of the three wire groups extending from said module body in different directions with respect to each other, wherein said at least three wire groups are configured to be electrically connected at their ends on a side remote from said module body to pieces of electrical equipment, wherein the pieces of electrical equipment comprise a motor for driving an adjuster for a vehicular seat, and wherein each wire harness group is connected to a side of the module body that is closest to the piece of electrical equipment that is connected to the respective wire harness group.

2. The electrical equipment module according to claim 1, wherein each of said at least three wire groups is comprised of a wire harness having a bundle of wires constituting a wire group or a flat cable having wires arranged two-dimensionally.

3. The electrical equipment module according to claim 1, wherein said module body is formed into a rectangular parallelepiped shape and has four sides thereof extending substantially perpendicular to one another.

4. The electrical equipment module according to claim 1, wherein said module body is formed in a plate shape, and
   said at least three wire groups extend sideward from a plate surface of said module body.

5. The electrical equipment module according to claim 1, wherein said module body incorporates a control section electrically connected to said power distribution section, and said control section is connected to at least one of the pieces of electrical equipment via at least one of said at least three wire groups to thereby drivingly control the pieces of electrical equipment.

6. The electrical equipment module according to claim 1, wherein at least one of said at least three wire groups is provided with connectors at an end thereof disposed on a side remote from said module body.

7. The electrical equipment module according to claim 1, wherein at least one of said at least three wire groups has connectors at an end thereof disposed on a side close to said module body, and
   said connectors are adapted to be connected to connectors provided on said module body and electrically connected to said power distribution section or said control section.

8. The electrical equipment module according to claim 1, wherein said module body is mounted in a body of a vehicle, and
   the pieces of electrical equipment comprise vehicle-mounted components.

9. The electrical equipment module according to claim 8, wherein said module body is placed in a component of a vehicular seat.

10. The module of claim 1, wherein the at least three wire groups extend directly from the module body.

11. An electrical equipment module, comprising:
    a module body; and
    a floor connector for connecting to power supply and signal lines and for supplying power to the module body;
    wherein the module body comprises a joint section that is integrally formed with the floor connector, wherein the joint section has a power distribution section that is adapted to be electrically connected to pieces of electrical equipment via wire groups, wherein the power distribution section is integrally formed with the module body, wherein the power distribution section is configured to distribute power to the pieces of electrical equipment, wherein the power distribution section comprises a ground power distribution section, and wherein the electrical equipment includes at least a heater and at least one motor.

12. The electrical equipment module according to claim 11, additionally comprising an electric connecting section that is electrically connected to at least one of the pieces of electrical equipment.

13. The electrical equipment module according to claim 11, wherein said module body incorporates a control section electrically connected to said power distribution section or an electric connecting section, and said control section is electrically connected to at least one of the pieces of electrical equipment via at least one of said other wire groups and drivingly controls said at least one of the pieces of electrical equipment.

14. The electrical equipment module according to claim 11, wherein said module body is placed in a component of a vehicular seat.

15. The electrical equipment module according to claim 11, wherein said module body has a first radio communication section formed integrally therewith and electrically connected to said control section, and signals associated with at least one of the pieces of electrical equipment are exchanged between said first radio communication section and a second radio communication section electrically connected to the at least one of the pieces of electrical equipment.

* * * * *